US007765433B1

(12) United States Patent
Krishnamurthy

(10) Patent No.: US 7,765,433 B1
(45) Date of Patent: Jul. 27, 2010

(54) TECHNIQUE FOR PERFORMING DISASTER REHEARSAL FOR A STORAGE AREA NETWORK UTILIZING A REPLICATION APPLIANCE

(75) Inventor: Raghu Krishnamurthy, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 447 days.

(21) Appl. No.: 11/686,031

(22) Filed: Mar. 14, 2007

(51) Int. Cl.
*G06F 11/00* (2006.01)
(52) U.S. Cl. ................................. 714/42; 714/4; 714/6
(58) Field of Classification Search .................... 714/42
See application file for complete search history.

(56) References Cited

U.S. PATENT DOCUMENTS

| 6,092,066 | A | * | 7/2000 | Ofek ........................... 707/10 |
| 6,643,748 | B1 | * | 11/2003 | Wieland ..................... 711/152 |
| 7,035,882 | B2 | * | 4/2006 | Takeda et al. ............... 707/205 |
| 2004/0024838 | A1 | * | 2/2004 | Cochran ..................... 709/214 |
| 2006/0075148 | A1 | * | 4/2006 | Osaki ........................... 710/5 |
| 2006/0236060 | A1 | * | 10/2006 | Shitomi et al. .............. 711/170 |
| 2007/0250738 | A1 | * | 10/2007 | Phan ............................. 714/6 |

OTHER PUBLICATIONS

EMC Corporation, White Paper, "EMC RecoverPoint Family Overview: A Detailed Review", pp. 1-16, Dec. 2006.
EMC Corporation, "EMC RecoverPoint: A Continuous Remote Replication and Continuous Data Protection Solution", Data Sheet S11540806V1/H2233, 2006.
EMC Corporation, White Paper, "Utilizing the Cisco SANTap Service with EMC RecoverPoint", p. 1-11, Aug. 2006.

* cited by examiner

*Primary Examiner*—Emerson C Puente
(74) *Attorney, Agent, or Firm*—Hunton & Williams, LLP

(57) ABSTRACT

A technique for disaster rehearsal testing in storage area network (SAN) utilizing a replication appliance is disclosed. In one particular exemplary embodiment, the technique may be realized as a method for disaster rehearsal testing of a secondary storage area network utilizing a replication appliance comprising the steps of stopping data writes to one or more logical unit numbers associated with the secondary storage area network, accumulating the data writes from a primary storage area network in one or more journals associated with the secondary storage area network, redirecting one or more data input/output requests, wherein data writes generated by testing of the secondary storage area network are redirected to replication appliance associated with the secondary storage area network and read requests for data written by test data writes are redirected to the replication appliance and testing the secondary storage area network.

20 Claims, 3 Drawing Sheets

TECHNIQUE FOR PERFORMING DISASTER REHEARSAL FOR A STORAGE AREA NETWORK UTILIZING A REPLICATION APPLIANCE

FIELD OF THE DISCLOSURE

The present disclosure relates generally to a system and method of performing disaster rehearsal for a storage area network (SAN) and, more particularly, to a technique for performing disaster rehearsal for a storage area network (SAN) utilizing a replication appliance.

BACKGROUND OF THE DISCLOSURE

Disaster rehearsal for a storage area network utilizing a replication appliance is challenging to perform adequately. Stopping replication between a primary storage area network and a secondary storage area network so that no data writes are replicated across to the secondary storage area network is one current way to test the secondary storage area network (SAN) as it would perform if the primary storage area network were to go down. This approach requires replication to be stopped between the primary storage area network and the secondary SAN so that a secondary host can utilize Logical Unit Numbers (LUNs) associated with the secondary SAN. Disaster rehearsal testing requires not only reading data but also writing data to ensure that full functionality is available in case the primary SAN fails. Resynchronization of the two SANs in this method requires a full resynchronization which requires sending all data from the primary SAN to the secondary SAN. This can have a significant impact on the performance and availability of both SANs, and is a time consuming, expensive and inefficient process. Additionally, if the secondary SAN is written to during testing, there is not a clean copy of production data in the event that the primary SAN fails.

Another approach involves creating a snapshot of the data on the secondary SAN and exporting the snapshot. The replication appliance then exports virtual LUNS pointing to the snapshot for the secondary host. The disaster rehearsal then uses the virtual LUNS and the snapshot data to test. During this testing all input/output (I/O) goes through the replication appliance. Thus, the direct path from the secondary host to secondary LUNs and the corresponding data is never tested. This is significant because this is the path and the data that would be used if the primary SAN did fail. Furthermore, all input/output during this testing going through the replication appliance adds network traffic that the replication appliance has to handle. Additionally, it is not a true test of the components of the secondary SAN.

Still another approach requires pausing replication and exporting a full copy of the secondary SAN data. The replication appliance then exports virtual LUNs pointing to the exported copy for the secondary host to utilize. The secondary host is required once again to route all input and output through the replication appliance during disaster rehearsal testing against the exported copy. Again, the direct path from the secondary host to secondary LUNs and the corresponding data is not tested. As in the previous approach, network traffic that the replication appliance has to handle is greatly increased and it is not a true test of the components of the secondary SAN.

In view of the foregoing, it would be desirable to provide a technique for disaster rehearsal testing in storage area network (SAN) utilizing a replication appliance which overcomes the above-described inadequacies and shortcomings.

SUMMARY OF THE DISCLOSURE

A technique for disaster rehearsal testing in storage area network (SAN) utilizing a replication appliance is disclosed. In one particular exemplary embodiment, the technique may be realized as a method for disaster rehearsal testing of a secondary storage area network utilizing a replication appliance comprising the steps of stopping data writes to one or more logical unit numbers associated with the secondary storage area network, accumulating the data writes from a primary storage area network in one or more journals associated with the secondary storage area network, redirecting one or more data input/output requests, wherein data writes generated by testing of the secondary storage area network are redirected to replication appliance associated with the secondary storage area network and read requests for data written by test data writes are redirected to the replication appliance and testing the secondary storage area network, wherein the testing utilizes the logical unit numbers associated with the secondary storage area network for read requests of data accessible through the logical unit numbers.

In accordance with other aspects of this particular exemplary embodiment, there is shown an article of manufacture for disaster rehearsal testing of a storage area network utilizing a replication appliance, the article of manufacture comprising, at least one processor readable carrier and instructions carried on the at least one carrier, wherein the instructions are configured to be readable from the at least one carrier by at least one processor and thereby cause the at least one processor to operate so as to stop data writes to one or more logical unit numbers associated with the secondary storage area network accumulate the data writes from a primary storage area network in one or more journals associated with the secondary storage area network redirect one or more data input/output requests, wherein data writes generated by testing of the secondary storage area network are redirected to replication appliance associated with the secondary storage area network and read requests for data written by test data writes are redirected to the replication appliance and test the secondary storage area network, wherein the test utilizes the logical unit numbers associated with the secondary storage area network for read requests of data accessible through the logical unit numbers.

In accordance with further aspects of this particular exemplary embodiment, there is shown a system for disaster rehearsal testing of a secondary storage area network utilizing a replication appliance comprising one or more processors for stopping data writes to one or more logical unit numbers associated with the secondary storage area network, a journal for accumulating the data writes from a primary storage area network in one or more journals associated with the secondary storage area network, an input/output redirector for redirecting one or more data input/output requests, wherein data writes generated by testing of the secondary storage area network are redirected to replication appliance associated with the secondary storage area network and read requests for data written by test data writes are redirected to the replication appliance, and a host for testing the secondary storage area network, wherein the testing utilizes the logical unit numbers associated with the secondary storage area network for read requests of data accessible through the logical unit numbers.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
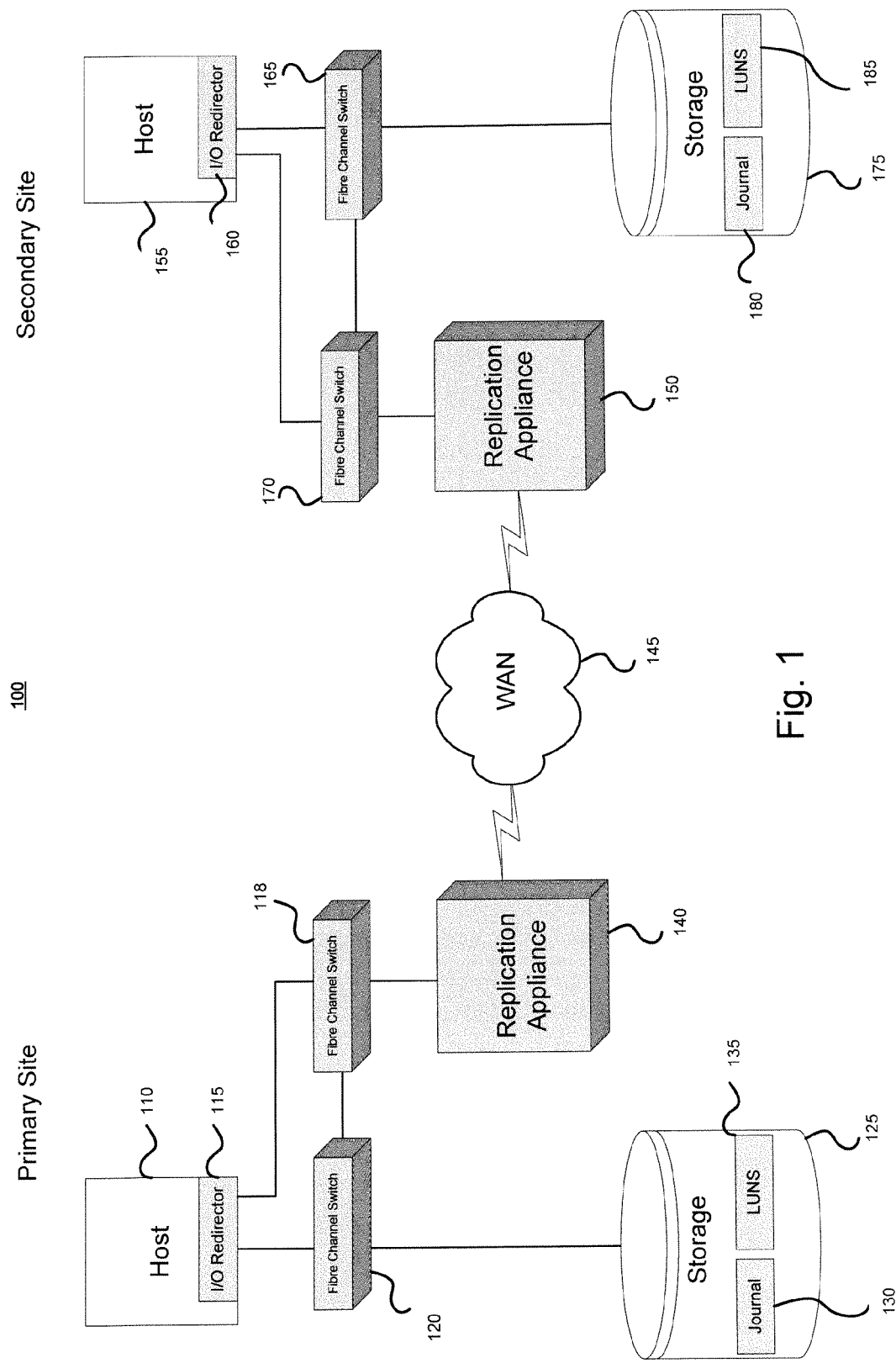
FIG. 1 shows exemplary primary and secondary SAN sites synchronized over a WAN using replication appliances in accordance with an embodiment of the present disclosure.

Referring to FIG. 1, there is shown a System 100 comprising an primary and secondary SAN sites synchronized over a wide area network (WAN) 145 using replication appliances in accordance with an embodiment of the present disclosure. Host 110 may represent a primary production host containing Input/Output (I/O) Redirector 115. I/O Redirector 115 may send a copy of data writes to Replication Appliance 140 via Fibre Channel Switch 118 and a copy to Storage 125 via Fibre Channel Switch 120. Fibre Channel Switch 118 may connect Host 110 with Replication Appliance 140 and Host 110 may connect to Storage 125 via Fibre Channel Switch 120. Storage 125 may contain Journal 130 for tracking write requests and logical unit numbers (LUNS) 135 for accessing storage volumes.

Replication Appliance 140 may replicate data across WAN 145 to one or more secondary SAN sites. WAN 145 may represent a wide area network which may be implemented using a variety of networking protocols and topologies such as, for example, Asynchronous Transfer Mode (ATM), Frame Relay, TCP/IP, or other protocols and/or topologies. Replication Appliance 150 may be a replication appliance of a secondary SAN and may receive data from Replication Appliance 140. Replication Appliance 150 may forward data received from Replication Appliance 140 through Fibre Channel Switch 170 and Fibre Channel Switch 165 to Storage 175. Storage 175 may contain Journal 180 for tracking write requests and logical unit numbers (LUNS) 185 for accessing storage volumes. Host 155 may represent a Host at a secondary SAN site and may be used for testing and disaster rehearsal. Host 155 may contain I/O Redirector 160. I/O Redirector 160 may be a light weight host splitter. In one or more embodiments, I/O Redirector 160 may send a copy of data write requests via Fibre Channel Switch 170 to Replication Appliance 150 and via Fibre Channel Switch 165 to Storage 175. In one or more embodiments, I/O Redirector 160 may be a component of Fibre Channel Switch 170 or of Fibre Channel Switch 165. I/O Redirector 160 may additionally represent functionality performed by a volume manager and may be implemented on Storage 175. In one or more embodiments, I/O Redirector 160 may be configured to redirect write requests to Replication Appliance 150. I/O Redirector 160 may utilize a virtual LUNS created by Replication Appliance 160 to send write requests to Replication Appliance 150. Replication Appliance 150 may write these requests to storage which may be contained on the replication appliance or may be otherwise accessible to Replication Appliance 150. I/O Redirector 160 may maintain a file indicating which bits of data represent writes performed by Replication Appliance 150. This file may be a bitmap file. I/O Redirector 160 may utilize the bitmap file or other maintained file to determine if a read request from Host 155 should be redirected to Replication Appliance 150. I/O Redirector 160 may redirect read requests to Replication Appliance 150 if one or more bits in a read request is contained in the file. Read requests which do request any bits written on Replication Appliance 150, may be sent to Storage 175.

Storage 175 may contain Journal 180 for tracking write requests and logical unit numbers (LUNS) 185 for accessing storage volumes. LUNS 185 may stop servicing write requests while continuing to service read requests. In one or more embodiments, LUNS 185 may be frozen so that one or more fileset domains accessed by LUNS 185 remains in a constant state. If LUNS 185 is frozen, write requests may accumulate in Journal 180. These write requests may represent data replication from a primary SAN.

While LUNS 185 is frozen, Host 155 may utilize it for disaster rehearsal testing. A production system represented by Host 110, Fibre Channel Switches 118 and 120, Storage 125 and Replication Appliance 140 may not be affected by this testing. Replication which synchronizes data on the secondary SAN site with data on the primary SAN site may continue during the testing. Data sent from the primary SAN site by I/O Redirector 115 and Replication Appliance 140 may continue to be sent across WAN 145 to Replication Appliance 150. Replication Appliance 150 may send write requests to Storage 175. Journal 180 may accumulate write requests while LUNS 185 is frozen. Writes requested during disaster rehearsal testing may be redirected by I/O Redirector 160 to Replication Appliance 150. I/O Redirector 160 may utilize a virtual LUNS exported by Replication Appliance 150 to send write requests to Replication Appliance 150. Read requests from Host 155 for data contained on Storage 175 may utilize LUNS 185. Disaster rehearsal testing may use LUNS 185 and may thus test the data path that would be utilized in the event that the primary SAN site fails.

When disaster rehearsal testing is complete normal functionality may be restored. LUNS 185 may be unfrozen or "thawed" and writes accumulated in Journal 180 may be written to the one or more volumes referenced by LUNS 185. I/O redirection by I/O Redirector 160 may be stopped and test data stored on Replication Appliance 150 may be discarded.

Figure 2:
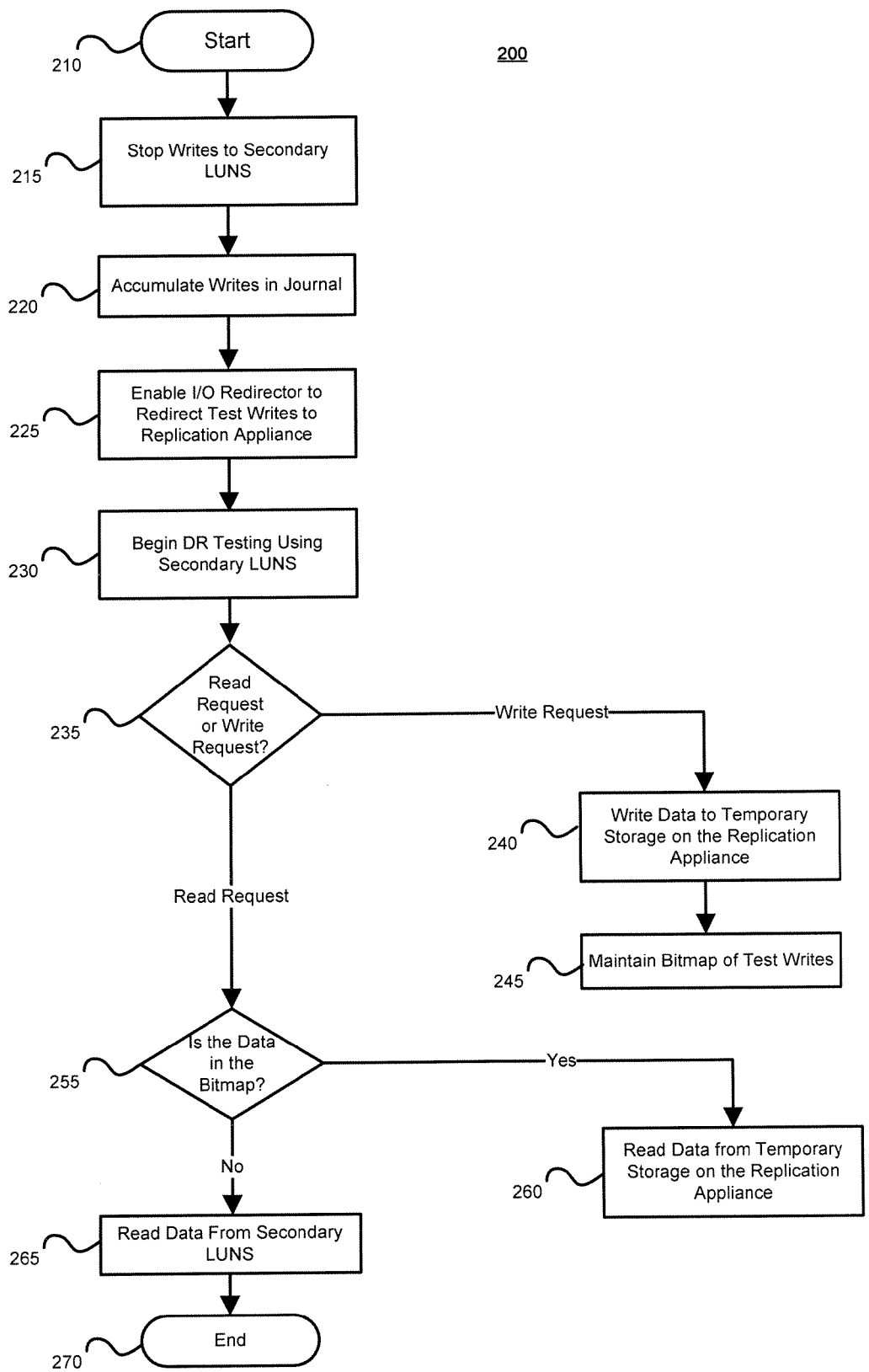
FIG. 2 shows an exemplary method of disaster rehearsal testing for a SAN utilizing a replication appliance in accordance with an embodiment of the present disclosure.

Referring to FIG. 2, there is shown an exemplary method 200 of disaster rehearsal testing for a SAN utilizing a replication appliance in accordance with an embodiment of the present disclosure. In one or more embodiments, the method 200 may begin at Step 210.

At Step 215, writes to the LUNS of a secondary SAN site may be stopped so that one or more volumes or one or more domains of a fileset remain constant. At Step 220, the writes sent from a replication appliance of the secondary SAN site, which may represent data synchronization from a primary SAN site, are accumulated in one or more journals of the secondary SAN site.

At Step 225, an I/O redirector may be enabled on the secondary SAN site. The I/O redirector may redirect write requests from a host of a secondary SAN site to a replication appliance of the secondary SAN site. The I/O redirector may reside on a host of the secondary SAN site, a fibre channel switch of the secondary SAN site, a volume manager of the secondary SAN site or on another network accessible element of the secondary SAN site.

At Step 230, disaster rehearsal testing may begin. For read requests of data contained on storage accessible by one or more LUNS of the secondary SAN site, the testing may use the one or more LUNS.

At step 235, the method may determine if a read request or a write request has been received. In one or more embodiments, this determination may be performed by an I/O redirector or an I/O splitter associated with the secondary SAN site. If it is a write request, it may be redirected to a replication appliance associated with the secondary SAN site. This may be done by using a virtual LUNS created by a replication appliance of the secondary SAN site which may point to storage on the replication appliance or storage accessible to the replication appliance. At Step 235, if a read request is received, it may proceed to Step 255.

At Step 240, a write request received during disaster rehearsal testing may be a test write request from one or more secondary hosts. The write request may be written to temporary storage using one or more virtual LUNS provided by a replication appliance associated with the secondary SAN site. At Step 245, a file may be maintained which may indicate one or more bits written as part of the testing. The file may be a bitmap file indicating which bits have been written to storage utilizing the virtual LUNS. In one or more embodiments, this file may be maintained by an I/O redirector or and I/O splitter associated with the secondary SAN site.

At Step 255, the method may determine whether data requested by a read request is contained on storage accessible by one or more LUNS associated with the secondary SAN site or with virtual LUNS provided by a replication appliance associated with the secondary SAN site. If the data is contained on storage accessible by the LUNS, the process may continue at Step 265. In one or more embodiments the method may determine this by verifying if the data is contained in a bitmap file indicating which bits have been written to storage utilizing the virtual LUNS. If the data is contained on storage accessible by the virtual LUNS, the process may continue at Step 260. At Step 265, the data may be read from one or more LUNs associated with the secondary SAN site. The read requests may originate at a host of the secondary SAN site and may thus follow the data path that would be utilized if a primary site failed. At Step 260, data may be read from temporary storage which may be read using a virtual LUNs, which may utilize storage on a replication appliance associated with the secondary SAN site. At Step 270, the method may end.

In one or more embodiments, this method may ensure that a significant number of read request are serviced by the data path and the LUNs that would be utilized in the event that the primary SAN site fails. Write requests resulting from replication from the primary SAN site may be stored in a journal so that replication is not stopped and synchronization between the primary and secondary sites may be maintained. Write requests resulting from testing on the secondary SAN site may be redirected to other storage, such as temporary storage on the replication appliance. This may preserve the integrity of the data on the secondary SAN site so that full synchronization, rollbacks, restorations, or other costly and time consuming efforts may not be required. The primary SAN site may remain unaffected during the entire testing process and during the restoration of the secondary SAN site to normal operations. Furthermore, the load to the replication appliance may be minimized.

Figure 3:
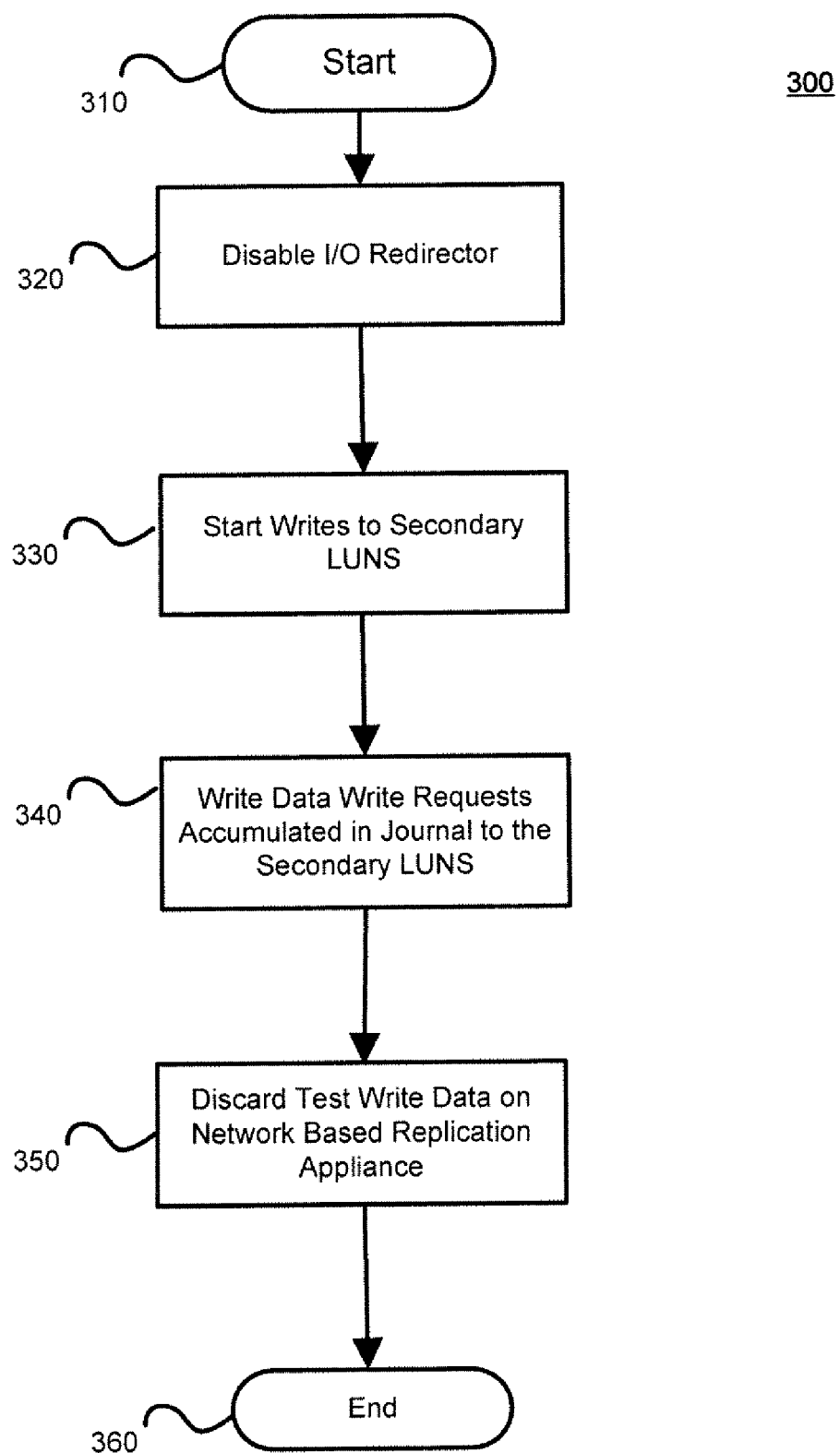
FIG. 3 shows an exemplary method of restoring writes to a secondary SAN in accordance with an embodiment of the present disclosure.

Referring to FIG. 3, there is shown an exemplary method 300 of restoring writes to a secondary SAN site in accordance with an embodiment of the present disclosure. According to one or more embodiments, the method 300 may begin at Step 310. At Step 320, one or more I/O Redirectors may be disabled. At Step 330, writes may be resumed to one or more LUNS associated with a secondary site. This may represent thawing or unfreezing the LUNS.

At Step 340, data accumulated in one or more journals associated with the secondary SAN site as a result of replication from a primary SAN site may be written to storage using the LUNS.

At Step 350, data written during testing to storage on one or more network based replication appliances associated with the secondary SAN site may be discarded. At Step 360, the method may end.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for disaster rehearsal testing of a secondary storage area network utilizing a replication appliance comprising the steps of:
   stopping data writes to one or more logical unit numbers associated with the secondary storage area network;
   accumulating the data writes from a primary storage area network in one or more journals associated with the secondary storage area network;
   redirecting one or more data input/output requests, wherein data writes generated by testing of the secondary storage area network are redirected to a replication appliance associated with the secondary storage area network and read requests for data written by test data writes are redirected to the replication appliance using a file mapping that identifies data written by the test data writes; and
   testing the secondary storage area network, wherein the testing utilizes the one or more logical unit numbers associated with the secondary storage area network for read requests of data accessible through the one or more logical unit numbers.

2. The method of claim 1, further comprising:
   maintaining the file mapping that identifies the data bits of the test write data;
   utilizing the file mapping to direct read requests for test data written to the replication appliance; and
   allowing reads not containing data in the file mapping to access the one or more logical unit numbers associated with the secondary storage area network.

3. The method of claim 1, further comprising:
   resuming normal operation of a secondary storage area network wherein resuming normal operation comprises:
   disabling the input/output redirection;

restarting the data writing to the one or more logical unit numbers associated with the secondary storage area network; and writing the data write requests from the first storage area network in the one or more journals to the one or more logical unit numbers associated with the secondary storage area network.

4. The method of claim 3, further comprising discarding the test write data.

5. The method of claim 1, wherein stopping data writes to one or more logical unit numbers associated with the secondary storage area network comprises freezing the one or more logical unit numbers.

6. The method of claim 1, wherein the replication appliance creates a virtual LUNS and the input/output redirection utilizes the virtual LUNS to write data during testing and to read data written during testing.

7. The method of claim 1, wherein the input/output redirection is performed by a host machine of the secondary storage area network.

8. The method of claim 1, wherein the input/output redirection is performed by a fibre channel switch of the secondary storage area network.

9. The method of claim 1, wherein the input/output redirection is performed by a volume manager of the secondary storage area network.

10. At least one processor readable storage medium storing a computer program of instructions configured to be readable by at least one processor for instructing the at least one processor to execute a computer process for performing the method as recited in claim 1.

11. An article of manufacture for disaster rehearsal testing of a storage area network utilizing a replication appliance, the article of manufacture comprising:

at least one processor readable storage medium; and
instructions stored on the at least one storage medium;
wherein the instructions are configured to be readable from the at least one storage medium by at least one processor and thereby cause the at least one processor to operate so as to:

stop data writes to one or more logical unit numbers associated with the secondary storage area network;

accumulate the data writes from a primary storage area network in one or more journals associated with the secondary storage area network;

redirect one or more data input/output requests, wherein data writes generated by testing of the secondary storage area network are redirected to a replication appliance associated with the secondary storage area network and read requests for data written by test data writes are redirected to the replication appliance using a file mapping that identifies data written by the test data writes; and test the secondary storage area network, wherein the test utilizes the one or more logical unit numbers associated with the secondary storage area network for read requests of data accessible through the one or more logical unit numbers.

12. A system for disaster rehearsal testing of a secondary storage area network utilizing a replication appliance comprising:

one or more processors for stopping data writes to one or more logical unit numbers associated with the secondary storage area network;

a journal for accumulating the data writes from a primary storage area network in one or more journals associated with the secondary storage area network;

an input/output redirector for redirecting one or more data input/output requests, wherein data writes generated by testing of the secondary storage area network are redirected to a replication appliance associated with the secondary storage area network and read requests for data written by test data writes are redirected to the replication appliance using a file mapping that identifies data written by the test data writes; and a host for testing the secondary storage area network, wherein the testing utilizes the one or more logical unit numbers associated with the secondary storage area network for read requests of data accessible through the one or more logical unit numbers.

13. The system of claim 12, wherein the input/output redirector maintains a file mapping that identifies the data bits of the test write data and utilizes the file mapping to direct read requests requiring test write data to the replication appliance and to allow reads not containing data in the file mapping to access the one or more logical unit numbers associated with the secondary storage area network.

14. The system of claim 12, further comprising:

one or more processors for resuming normal operation of a secondary storage area network wherein resuming normal operation comprises:

disabling the input/output redirector;

restarting the data writing of the one or more logical unit numbers associated with the secondary storage area network; and writing the data write requests from the first storage area network in the one or more journals to the one or more logical unit numbers associated with the secondary storage area network.

15. The system of claim 14, further comprising discarding the test write data.

16. The system of claim 12, wherein stopping data writes to one or more logical unit numbers associated with a secondary storage comprises freezing the one or more logical unit numbers.

17. The system of claim 12, wherein the replication appliance creates a virtual LUNS and the input/output redirector utilizes the virtual LUNS to write data during testing and to read data written during testing.

18. The system of claim 12, wherein the input/output redirector is on a host machine of the secondary storage area network.

19. The system of claim 12, wherein the input/output redirection is on a fibre channel switch of the secondary storage area network.

20. The system of claim 12, wherein the input/output redirector is on a volume manager of the secondary storage area network.

* * * * *